Patented Mar. 8, 1932

1,848,228

UNITED STATES PATENT OFFICE

ARNOLD SHEPHERDSON AND SIDNEY THORNLEY, OF BLACKLEY, MANCHESTER, ENGLAND, ASSIGNORS TO BRITISH DYESTUFFS CORPORATION LIMITED, OF MANCHESTER, ENGLAND

METHOD OF MAKING BLACK AND GRAY VAT DYES AND THE PRODUCTS THEREOF

No Drawing. Application filed August 22, 1927, Serial No. 214,786, and in Great Britain August 24, 1926.

In a co-pending application Serial No. 193,378 of Sidney Thornley, filed May 21, 1927, there is described the production of new vat dyestuffs by treating the dyes obtained by alkaline fusion of benzanthrone sulphonic acid with hydroxylamine in the presence of sulphuric acid.

We have now found that bluish-gray to violet and black dyes may be obtained from benzanthrone sulphonic acids, that is sulphonated benzanthrone bodies including in this latter term not merely sulphonic acids of benzanthrone itself, but also the sulphonated methyl benzanthrones, halogenated benzanthrones and the like, by treating them with hydroxylamine and then subjecting the product obtained to alkaline fusion. If desired, the sulphonation of the benzanthrone body and the subsequent hydroxylamine treatment may be carried out without isolation of the sulphonated benzanthrone, thus effecting an economy by a reduced consumption of sulphuric acid.

The dyestuffs are applied to the fibre from a vat, as is usual with vat dyestuffs.

The alkaline fusion can be effected with alcoholic potash or with molten caustic soda or caustic potash.

The new dyestuffs produced by the present invention are soluble in concentrated sulphuric acid with a red-violet to olive-green coloration, are appreciably soluble in nitrobenzene and anilin, but are insoluble in other usual organic solvents. These new dyestuffs give a reddish-violet to blue hydrosulphite vat from which cotton is dyed in bluish-violet to bluish-gray or black shades.

The following examples will illustrate good methods of proceeding according to our invention, without limiting our invention:

*Example I.*—16.8 parts of benzanthrone sulphonic acid are dissolved in 280 parts of sulphuric acid 66° Bé. by stirring. 17.5 parts of ferrous sulphate crystals are added, followed after cooling by the gradual addition of 7 parts hydroxylamine hydrochloride. The mixture is heated with stirring to 150° C. and maintained at 150° C. for 2 hours, after which it is cooled and poured into 1120 parts of ice and water. The mixture is now stirred for several hours and filtered, the residue being washed with 20 per cent salt solution and dried. The intermediate product thus obtained is, in the form of its sodium salt, a reddish-brown powder. It dissolves in concentrated sulphuric acid to a yellow-orange solution of the sulphate which exhibits a green fluorescence. In dilute sulphuric acid it is soluble to a yellow-orange solution which becomes reddish-brown on the addition of alkali.

10 parts of the product are gradually added to 100 parts of stirred molten caustic potash at 180° C. The temperature is gradually raised to 240° C. during which considerable frothing and evolution of ammonia occurs. The mixture is now kept at 240° C. for 1 hour, after which it is cooled and extracted with 2000 parts of water. The whole is heated up, air blown through and filtered, the residue being washed with dilute caustic soda. It is now boiled up with dilute hydrochloric acid, filtered, and the residue washed with water, drained and dried. The product dyes cotton bluish-gray to bluish-black shades.

*Example II.*—30 parts of benzanthrone are stirred at 98–100° C. with 210 parts of 7 per cent oleum until complete sulphonation has occurred; this is indicated by complete solubility of a test portion in water. The mixture is now diluted with 10 parts of water and 580 parts of sulphuric acid, 66° Bé., and stirred. 48 parts of ferrous sulphate crystals are added, the whole cooled, followed by the gradual addition of 20 parts hydroxylamine hydrochloride. The mixture is heated with stirring to 150° C. and maintained at 150° C. for 2 hours, after which it is cooled and poured into 4200 parts of ice and water. 1000 parts of salt are now added and the mixture stirred for several hours, filtered, and the residue washed with 20 per cent salt solution and dried.

10 parts of the product are gradually added to 100 parts of stirred molten caustic potash at 180° C. The temperature is gradually raised to 240° C. during which considerable frothing and evolution of ammonia occurs. The mixture is now kept at 240° C.

for 1 hour, after which it is cooled and extracted with 2000 parts of water. The whole is heated up, air blown through to oxidize, and filtered, the residue being washed with dilute caustic soda. It is now boiled up with dilute hydrochloric acid, filtered, and the residue washed with water, drained and dried. The product dyes cotton bluish-gray to bluish-black shades.

If in place of the 30 parts of benzanthrone, 31.8 parts of methylbenzanthrone, melting point 197–199° C., prepared from 2-methylanthraquinone, be used, a very similar dye is obtained.

Instead of hydroxylamine a solution of hydroxylamine as obtained by the electrolytic reduction of nitric acid may be employed.

*Example III.*—23 parts of Bz-1-chlorobenzanthrone, having the formula

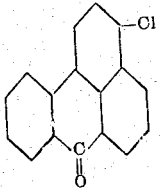

are stirred at 15–20° C. with 240 parts of 7 per cent oleum until the solubility of a test portion in water indicates that complete sulphonation has occurred. 152 parts of sulphuric acid (96 per cent) are then added followed by 12 parts of water from a burette, the whole being cooled in a water-bath. Then 24 parts of well ground ferrous sulphate crystals are added followed by the gradual addition of 13.2 parts of hydroxylamine hydrochloride. The mixture is now heated to, and maintained at 145–150° C. for 2 hours. After cooling the reaction mixture is poured into 800 parts of ice and 800 parts of water, stirred, 200 parts of salt added, restirred, and filtered. The residue is washed acid-free with 20 per cent salt solution and dried. (During the washing the colour changes from yellow-brown to chocolate). Yield=60.5 parts containing salt. 60 parts of powdered caustic potash, and 30 parts of absolute alcohol are heated with stirring at 150–155° C. for half-an-hour. The temperature is now raised to 170° C. distilling off at the same time 10 ccs. of alcohol. 18.2 parts of the 60.5 parts of the intermediate are now added the temperature is maintained at 170–175° C. for 1 hour, raised to 230° C. in half an hour, and maintained at 230–240° C. for 2 hours. The melt after cooling is extracted with water, boiled, and oxidized by passing through it a stream of air. It is then filtered and the residue washed alkali-free with hot water, and dried. Yield=6.0 parts of pure dyestuff representing a total yield of 19.9 parts from the 23 parts of 3-chloro-benzanthrone. With caustic soda and sodium hydrosulphite it gives a blue coloured vat which dyes cotton after oxidation a violet shade.

*Example IV.*—1 part of paste (10 per cent) made from dyestuff prepared according to any of the preceding examples is reduced by stirring with 5 parts of water, 8.5 parts of caustic soda solution 76° Tw. and 1.5 parts of sodium hydrosulphite and adding this mixture to 1250 parts of water at 60° C. To the vat thus prepared 50 parts of cotton are added and worked at 60° C. for half an hour. The cotton is rinsed, the dye oxidized by exposure to air, and the material then acidified, rinsed, soaped and dried.

What we claim and desire to secure by Letters Patent is:—

1. The process for the manufacture of dyes, comprising the condensation of a sulphonated benzanthrone compound of the class consisting of sulphonated benzanthrone, sulphonated alkyl benzanthrone and sulphonated halogenated benzanthrone, with hydroxylamine, followed by alkaline fusion of the product so obtained.

2. The process for the manufacture of dyes, comprising the condensation of a sulphonated benzanthrone compound of the class consisting of sulphonated methyl benzanthrone and sulphonated chlorobenzanthrone, with hydroxylamine, followed by alkaline fusion of the product so obtained using alcoholic potash.

3. As new products, the group of vat dyestuffs obtainable by the alkaline fusion of the condensation product of a sulphonated benzanthrone compound of the class consisting of sulphonated benzanthrone, sulphonated alkyl benzanthrone and sulphonated halogenated benzanthrone, with hydroxylamine, the said dyestuffs being soluble in concentrated sulphuric acid with a red-violet to olive-green coloration, appreciably soluble in nitrobenzene and anilin, but insoluble in other usual organic solvents, the said dyestuffs yielding a reddish-violet to blue hydrosulphite vat from which cotton is dyed in bluish-violet to bluish-gray or black shades.

4. As new products, the members of the group of vat dyestuffs obtainable by the alkaline fusion of the condensation product of a sulphonated benzanthrone compound of the class consisting of sulphonated benzanthrone, sulphonated methylbenzanthrone and sulphonated chlorobenzanthrone, with hydroxylamine, said members of said group being soluble in concentrated sulphuric acid with a red-violet coloration, appreciably soluble in nitrobenzene and anilin but insoluble in other usual organic solvents, said members yielding a reddish-violet hydrosulphite vat from which cotton is dyed in bluish-gray to black shades.

5. As a new product, a member of the group of vat dyestuffs obtainable by the alkaline fusion of the condensation product of a sulphonated benzanthrone with hydroxylamine, said member being soluble in concentrated sulphuric acid with a dull red-violet coloration, appreciably soluble in nitrobenzene and anilin but insoluble in other usual organic solvents, said member yielding a reddish-violet hydrosulphite vat from which cotton is dyed in bluish-gray to black shades.

6. In the manufacture of dyes from sulphonated benzanthrone compounds of the class consisting of benzanthrone, alkyl-benzanthrone and halogenated-benzanthrone, the process which comprises sulphonating such a benzanthrone compound by reacting the same with a sulphonating agent, condensing the sulphonated product thus produced with hydroxylamine and then subjecting the condensation product to an alkaline fusion and recovering the said dye.

7. The process of claim 6 in which the sulphonating agent is oleum.

8. In the manufacture of dyes from sulphonated benzanthrone compounds of the class consisting of benzanthrone, alkyl-benzanthrone and halogenated-benzanthrone, the process which comprises sulphonating benzanthrone by reacting the same with a sulphonating agent, condensing the sulphonated product thus produced with hydroxlamine and then subjecting the condensation product to an alkaline fusion and recovering the said dye.

9. In the manufacture of dyes from sulphonated benzanthrone compounds of the class consisting of benzanthrone, alkyl-benzanthrone and halogenated-benzanthrone, the process which comprises sulphonating methyl-benzanthrone by reacting the same with a sulphonating agent, condensing the sulphonated product thus produced with hydroxylamine and then subjecting the condensation product to an alkaline fusion and recovering the said dye.

10. In the manufacture of dyes from sulphonated benzanthrone compounds of the class consisting of benzanthrone, alkyl-benzanthrone and halogenated-benzanthrone, the process which comprises sulphonating chlorobenzanthrone by reacting the same with a sulphonating agent, condensing the sulphonated product thus produced with hydroxylamine and then subjecting the condensation product to an alkaline fusion and recovering the said dye.

11. In the manufacture of dyes from sulphonated benzanthrone compounds of the class consisting of benzanthrone, methyl-benzanthrone and chlorobenzanthrone, the process which comprises sulphonating such a benzanthrone compound by reacting the same with a sulphonating agent, condensing in the presence of sulphuric acid the sulphonated compound thus produced with a hydroxylamine material of the class consisting of hydroxylamine and salts of hydroxylamine, and then subjecting the condensation product to an alkaline fusion and recovering the said dye.

12. The process of claim 11 in which the hydroxylamine compound is hydroxylamine hydrochloride.

13. In the manufacture of dyes from sulphonated benzanthrone compounds of the class consisting of benzanthrone, methyl-benzanthrone and chlorobenzanthrone, the process which comprises condensing in the presence of sulphuric acid such as sulphonated benzanthrone compound with hydroxylamine materials of the class consisting of hydroxylamine and salts of hydroxylamine and then subjecting the condensation product thus produced to an alkaline fusion with caustic potash and recovering the said dye.

14. As a new product, a member of the group of vat dyestuffs obtainable by the alkaline fusion of the condensation product of sulphonated methyl benzanthrone with hydroxylamine, said member being soluble in concentrated sulphuric acid with a red-violet coloration and appreciably soluble in nitrobenzene and aniline but insoluble in other organic solvents, said member yielding a reddish-violet hydrosulphite vat from which cotton is dyed in bluish-gray shades.

15. As a new product, a member of the group of vat dyestuffs obtainable by the alkaline fusion of the condensation product of sulphonated chlorobenzanthrone with hydroxylamine, said member being soluble in concentrated sulphuric acid with a red-violet coloration, being appreciably soluble in nitrobenzene and aniline but being insoluble in other organic solvents.

16. In the manufacture of dyes, the process which comprises dissolving a sulphonated benzanthrone compound of the class consisting of benzanthrone sulphonic acid, sulphonated 2-methyl-benzanthrone and sulphonated Bz-1-chlorobenzanthrone, in sulphuric acid of 66° Bé. strength, adding ferrous sulphate crystals to the solution thus obtained, cooling the solution, gradually adding hydroxylamine hydrochlorid, heating the mixture thus obtained to effect reaction between said sulphonated benzanthrone compound and the hydroxylamine compound, pouring the reaction product into a mixture of ice and water, isolating, purifying and drying the reaction product thus obtained, fusing the dried reaction product with caustic potash, cooling the melt and extracting with water, heating the solution thus obtained and oxidizing by passing air through said solution, isolating, purifying and drying the precipitated dyestuff thus obtained.

17. In the manufacture of dyes, the process which comprises reacting benzanthrone with 7 per cent oleum to produce a benzanthrone sulphonic acid, dissolving said benzanthrone sulphonic acid in sulphuric acid of 66° Bé. strength, adding ferrous sulphate crystals to the solution thus obtained, cooling the solution, gradually adding hydroxylamine hydrochlorid, heating the mixture thus obtained to effect reaction between said benzanthrone compound and said hydroxylamine compound, pouring the reaction product into a mixture of ice and water, isolating, purifying and drying the reaction product thus obtained, fusing the dried reaction product with caustic potash, cooling the melt and extracting with water, heating the solution thus obtained and oxidizing by passing air through said solution, isolating, purifying and drying the precipitated dyestuff thus obtained.

18. In the manufacture of dyes, the process which comprises reacting 2-methyl-benzanthrone with 7 per cent oleum to produce a 2-methyl-benzanthrone sulphonic acid, dissolving said 2-methyl-benzanthrone sulphonic acid in sulphuric acid of 66° Bé. strength, adding ferrous sulphate crystals to the solution thus obtained, cooling the solution, gradually adding hydroxylamine hydrochlorid, heating the mixture thus obtained to effect reaction between said benzanthrone compound and said hydroxylamine compound, pouring the reaction product into a mixture of ice and water, isolating, purifying and drying the reaction product thus obtained, fusing the dried reaction product with caustic potash, cooling the melt and extracting with water, heating the solution thus obtained and oxidizing by passing air through said solution, isolating, purifying and drying the precipitated dyestuff thus obtained.

19. In the manufacture of dyes, the process which comprises reacting Bz-1-chlorobenzanthrone with 7 per cent oleum to produce a Bz-1-chlorobenzanthrone sulphonic acid, dissolving said Bz-1-chlorobenzanthrone sulphonic acid in sulphuric acid of 66° Bé. strength, adding ferrous sulphate crystals to the solution thus obtained, cooling the solution, gradually adding hydroxylamine hydrochlorid, heating the mixture thus obtained to effect reaction between said benzanthrone compound and said hydroxylamine compound, pouring the reaction product into a mixture of ice and water, isolating, purifying and drying the reaction product thus obtained, fusing the dried reaction product with caustic potash, cooling the melt and extracting with water, heating the solution thus obtained and oxidizing by passing air through said solution, isolating, purifying and drying the precipitated dyestuff thus obtained.

In testimony whereof we affix our signatures.

ARNOLD SHEPHERDSON.
SIDNEY THORNLEY.

CERTIFICATE OF CORRECTION.

Patent No. 1,848,228.             Granted March 8, 1932, to

ARNOLD SHEPHERDSON ET AL.

It is hereby certified that error appears in the printed specification of the above numbered patent requiring correction as follows: Page 3, line 79, claim 13, for the word "as" read a; and that the said Letters Patent should be read with this correction therein that the same may conform to the record of the case in the Patent Office.

Signed and sealed this 26th day of April, A. D. 1932.

(Seal)

M. J. Moore,
Acting Commissioner of Patents.